US009204032B2

(12) United States Patent
Torabi

(10) Patent No.: US 9,204,032 B2
(45) Date of Patent: Dec. 1, 2015

(54) CAMERA AND METHOD FOR TAKING SHARP IMAGES

(71) Applicant: SICK AG, Waldkirch (DE)

(72) Inventor: Bahram Torabi, Waldkirch (DE)

(73) Assignee: SICK AG, Waldkirch (DE)

( * ) Notice: Subject to any disclaimer, the term of this patent is extended or adjusted under 35 U.S.C. 154(b) by 122 days.

(21) Appl. No.: 13/961,949

(22) Filed: Aug. 8, 2013

(65) Prior Publication Data

US 2014/0055662 A1 Feb. 27, 2014

(30) Foreign Application Priority Data

Aug. 24, 2012 (EP) .................................... 12181646

(51) Int. Cl.
*H04N 5/232* (2006.01)
*G06K 7/10* (2006.01)

(52) U.S. Cl.
CPC ........ *H04N 5/23212* (2013.01); *G06K 7/10831* (2013.01)

(58) Field of Classification Search
CPC .......... H04N 5/23212; G06K 7/10821; G06K 7/1094
See application file for complete search history.

(56) References Cited

U.S. PATENT DOCUMENTS

| 5,249,058 | A  | * | 9/1993  | Murata et al. ................. 348/354 |
|-----------|----|---|---------|----------------------------------------|
| 6,130,417 | A  |   | 10/2000 | Hashimoto                              |
| 6,344,930 | B1 | * | 2/2002  | Kaneko et al. ................ 359/666 |
| 6,683,652 | B1 | * | 1/2004  | Ohkawara et al. ............ 348/347   |
| 2004/0257461 | A1 | * | 12/2004 | Toyomura ..................... 348/345 |
| 2007/0053676 | A1 | * | 3/2007  | Pollard .............. H04N 5/23212 396/125 |
| 2008/0025715 | A1 |   | 1/2008  | Ishii                                  |
| 2008/0198257 | A1 | * | 8/2008  | Morimoto ..................... 348/345 |
| 2009/0059057 | A1 | * | 3/2009  | Long et al. .................... 348/343 |
| 2009/0167930 | A1 | * | 7/2009  | Safaee-Rad et al. .......... 348/347   |
| 2011/0217030 | A1 | * | 9/2011  | Muench ................. G03B 13/32 396/90 |
| 2012/0038818 | A1 | * | 2/2012  | Hamada ............. H04N 5/23212 348/349 |
| 2012/0057069 | A1 | * | 3/2012  | Yamasaki ..................... 348/345 |
| 2012/0133813 | A1 | * | 5/2012  | Nagano ......................... 348/311 |
| 2013/0044254 | A1 | * | 2/2013  | Tzur ............................. 348/345 |

(Continued)

FOREIGN PATENT DOCUMENTS

EP 2270571 A1 1/2011

OTHER PUBLICATIONS

European Search Report of corresponding application No. 12181646.6, dated Feb. 28, 2013, 7 pages.

*Primary Examiner* — Timothy J Henn
(74) *Attorney, Agent, or Firm* — Nath Goldberg & Meyer; Jerald L. Meyer; Christopher Thomas

(57) ABSTRACT

A camera is provided having an image sensor for taking images, a reception optics, an adjustable focusing unit for setting a focal position of the reception optics as well as a control and evaluation unit which is configured to continuously move the focal position of the reception optics between a first focal position and a second focal position by means of the focusing unit and to take a respective one image at at least one third focal position and one fourth focal position, to determine a degree of sharpness of the images and to determine a focal position of greatest image sharpness therefrom. The control and evaluation unit is configured to move the focal position cyclically and continuously to and fro between the first focal position and the second focal position and to take a further image when the focal position of greatest image sharpness is reached.

17 Claims, 2 Drawing Sheets

(56) References Cited

U.S. PATENT DOCUMENTS

Figure 1:
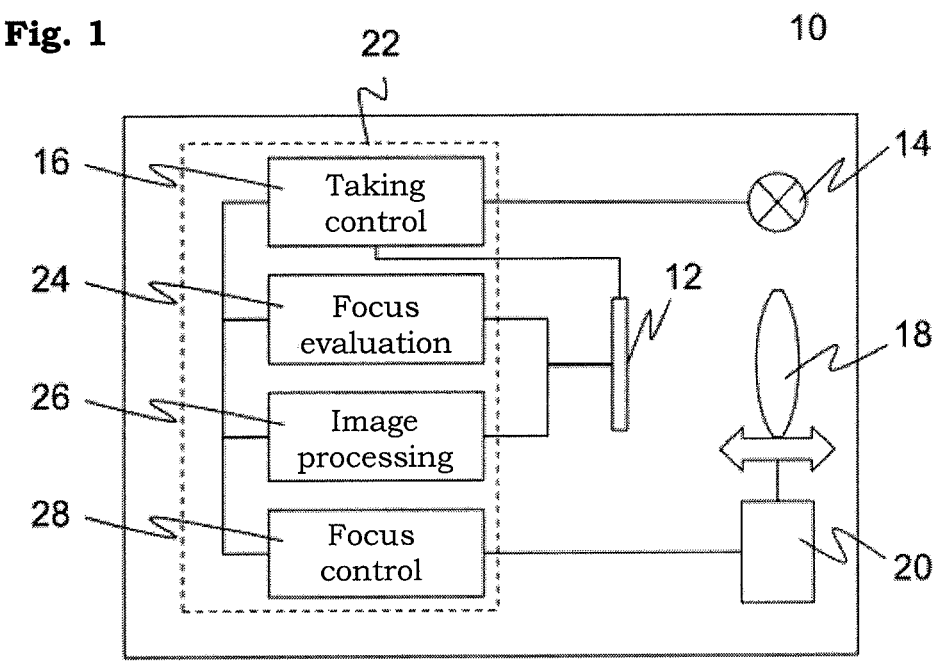

2013/0182140 A1* 7/2013 Yasuda ................. 348/222.1
2013/0293766 A1* 11/2013 Sugimoto ............... 348/345
2013/0329088 A1* 12/2013 Blayvas ................. 348/239
2014/0043435 A1* 2/2014 Blayvas .................. 348/46
2014/0098283 A1* 4/2014 Nguyen ............ H04N 5/23212
　　　　　　　　　　　　　　　　　　　　　348/345

* cited by examiner

CAMERA AND METHOD FOR TAKING SHARP IMAGES

The invention relates to a camera having an image sensor and to a method for taking sharp images in accordance with the preambles of claim 1 and claim 15 respectively.

Cameras having an image sensor for producing images in the form of image files are known in a variety of constructions. A special application of cameras is the reading of codes, for example at supermarket checkouts, for automatic package identification, sorting of pieces of mail or in baggage handling at airports. Objects with the codes located thereon are taken with the aid of the image sensor and the code regions are identified and decoded in the images by digital processing of the image data. Camera-based code readers also cope without problem with different code types than one-dimensional barcodes which also have a two-dimensional structure like a matrix code and provide more information. In an important application group, the objects bearing code are conveyed past the code reader. A camera, frequently a camera array, in this respect reads in the object images having the code information successively with the relative movement.

Many camera systems are able to focus automatically on a target object. As a rule, an upstream system determines the distance from the target object and transfers it to the camera system equipped with a fast focus adjusting unit. The camera system thereupon sets the focal position so that the target object or the selected image section is imaged in focus. An additional sensor is accordingly required for determining the distance for such an autofocus system.

An autofocus camera is known from US 2004/0109081 A1 in which the focusing lens moves continuously along an optical axis. A plurality of images are taken during the moving along of the focal position. An autofocus evaluation of the images is calculated using image processing and is based on the high-frequency portions of the images. A focal position which maximizes the autofocus evaluation is calculated from the different autofocus evaluations with respect to the different focal positions. The focusing lens is subsequently directly moved to this maximizing focal position. However, this procedure requires some lead time before a sharp (=in-focus) image can be taken and requires irregular movements of the focusing lens to set the maximizing focal position after its location.

It is therefore the object of the invention to provide an improved autofocus for a camera.

This object is satisfied by a camera having an image sensor and by a method for taking sharp images in accordance with claim 1 and claim 15 respectively. In this respect, the invention starts from the basic idea of moving the focal position continuously and periodically to and fro independently of a knowledge of the ideal focal position. Images which are very likely blurred due to the randomness of the focal position are taken at at least two different focal positions which are random per se, but which should have a specific minimum distance from one another for a good extrapolation basis. An ideal focal position is determined from these images with reference to their degree of sharpness. If the ideal focal position is now reached during a following cycle, a further, now probably sharp image is taken. It is therefore, unlike usually, not the desired focal position which is set, but rather the time behavior on the taking is adapted to a predefined regular change of the focal position (sampling time-based autofocus, STB).

As a rule, the image taken at the ideal focal position is further processed as a sharp image, while the other images are only used for determining the ideal focal position and are subsequently discarded. The image information can, however, also be used to join together (stitch) different image areas having objects at different distances from a plurality of images, for example, or to sharpen contrasts or carry out other corrections with reference to a plurality of different images of the same object at different focal positions.

The invention has the advantage that a simplified autofocus function is made possible with little effort and little cost in the putting into operation and manufacture. A separate distance determination can be dispensed with. Construction space is saved and the autofocus is free of calibration. Since the taking time for the further image at the focal position of greatest image sharpness relatively relates to the taking times at the third or fourth focal positions respectively, tolerances of the focusing unit due to temperature fluctuations, mechanical play or other error sources are compensated automatically so that the autofocus works in an exceptionally robust manner. The movements of the focusing unit take place in very smooth, regular paths, which again results in a greater robustness as well as in a longer service life.

Exactly one further image is preferably taken at the focal position of greatest image sharpness. However, a kind of scattershot is also conceivable with a plurality of shots in an environment of the focal position of greatest image sharpness, with then the best shot subsequently being selected or a superimposition image being prepared. The respective focal position of greatest image sharpness is swept over once every following half period so that sharp images can be taken at half the period at which the focal position is moved continuously to and fro.

The first focal position and/or the second focal position preferably correspond(s) to an end deflection of the focusing unit. The focal position accordingly in particular oscillates regularly between maximum positions. In this respect, they are preferably maximum possible deflections of the focusing unit. It is, however, also conceivable that the maximum positions are set to a selected object distance range. The first focal position and/or the second focal position can also be varied between cycles of the continuous travel of the focal position. This is useful, for example, when it is known or assumed on the basis of prior information that only a specific focal range is required for a specific time period.

The first focal position is preferably the same as the third focal position and/or the second focal position is the same as the fourth focal position. In other words, the images from which the degree of sharpness is determined for extrapolating the focal position of greatest image sharpness are taken just at the reversal points of the to and fro movement of the focusing unit. Further shots during the travel between the reversal points are conceivable for a wider basis of the extrapolation.

The control and evaluation unit is preferably configured to store at least one previously determined focal position of greatest image sharpness and to take it into account on the determination of a current focal position of greatest image sharpness. A history of the focal position of greatest image sharpness is therefore also used for the focal position of greatest image sharpness currently to be calculated. This is sensible when the scenery is at least not so highly dynamic that the same object can be expected at an at least similar distance between shots of further images in their respective focal positions of greatest image sharpness. The history can, for example, be taken into account in that the current focal position of greatest image sharpness is only determined in the form of a correction to the preceding focal position of greatest image sharpness or in that a weighted mean is formed in which focal positions of greatest image sharpness have the more weight, the older they are.

The control and evaluation unit is preferably configured to take account of at least one image previously taken at a focal position of greatest image sharpness on the determination of a current focal position of greatest image sharpness. The history of further images is also used here; however, not directly by inclusion of earlier focal positions of greatest image sharpness, but in that the further images taken in earlier cycles or half-cycles are also used as part of the extrapolation basis for the determination of the current focal position of greatest image sharpness. In both described possibilities of taking account of a history, a simpler procedure can be followed and they can also be combined with one another. A certain transient response and also hysteresis behavior can result from the history, in particular with highly dynamic sceneries.

The control and evaluation unit is preferably configured to join together a total image from sequentially taken images, in particular image lines of objects moved relative to the camera. This image processing, which is also called image stitching, is particularly suitable on a relative movement of the camera and the objects to be taken, as with a stationary mounting of the camera above a conveyor belt or a road. In these cases, a taking into account of a history of the focal positions of greatest image sharpness is particularly useful because the same objects are usually only detected with a small offset in successive shots. The total image which arises in this respect covers a larger region than the underlying individual images; accordingly, new picture elements or pixels are added with respect to the individual images. In a particularly preferred embodiment, the camera is a line scan camera which detects an object stream of objects moved relative to the camera line-wise during the relative movement. The image stitching can then take place very simply by stringing together on the basis of the known orientations and shifts between the individual images, whereas in other cases, correlating picture elements are looked for in overlap regions of individual images and they are joined together in a suitable manner.

The control and evaluation unit is preferably configured to calculate an image having improved image sharpness from a plurality of images. The shot to be used in this respect does not directly correspond to the further image which is taken at the focal position of greatest image sharpness. Instead, a further improved image is calculated by image processing, which improved image includes the images taken at the third and/or fourth focal position(s) or images taken even earlier. In this respect, multiple shots of mutually corresponding scenery sections are evaluated to increase the image quality. For example, image regions of objects at different distances are cut together from images which were taken at different focal positions. Another example is the calculation of picture elements from multiple shots of the same object at different focal positions to increase the contrast or to achieve other improvements due to the image information base which is increased with respect to a single shot.

The control and evaluation unit is preferably configured to determine the degree of sharpness of at least one region of interest of an image and to determine the focal position of greatest image sharpness using the degree of sharpness of the region of interest. The focus is therefore not directed to an averaged degree of sharpness for the whole image, but rather directly to specific image regions. This is particularly sensible for camera-based code readers because objects or code regions are to be taken in focus for this purpose and blurred image regions of the background can easily be accepted. Regions of interest can, for example, be identified by previous information of another sensor, for instance of a distance measuring laser scanner which detects the object geometry or they can be identified by image analysis of images taken at the first or second focal position or in a preceding cycle of the focus adjustment.

The control and evaluation unit is preferably configured to calculate and output a distance of taken objects. The distance information is contained in the calculated focal position of greatest image sharpness, with this focal position relating to an averaged distance of all objects or, with a restriction to regions of interest with a respective one object, also to individual objects. An output of distance information practically corresponds to a reversal of the otherwise usual process of first measuring the distance and subsequently setting the focus to it.

The camera preferably has a shutter or a pulse illumination device, in particular a flash illumination, with the control and evaluation unit being configured to fix a taking time for an image by opening the shutter or releasing an illumination pulse. The camera thus has a simple control possibility to trigger the image shots at a precise time at the third or fourth focal positions and also optionally at further focal positions for determining an extrapolation basis for the image sharpness and in particular at the determined focal position of greatest image sharpness.

The focusing unit preferably has an optomechanical adjusting unit for varying a focal length or a back focal length of the reception optics. In this respects distances between lenses, mirrors or other optical elements of the reception optics are varied to be able to continuously vary the focal position. The optomechanical adjusting unit has components such as a motor, a moving coil or similar. A liquid lens is alternatively used. It can then directly adjust its own focal length, for example in that the curvature of a membrane is varied by pumping liquid into or out of a chamber bounded by the membrane or in that the curvature properties of a boundary surface between two optically transparent media are varied by applying a different voltage (electrowetting effect).

The camera is preferably configured as a camera-based code reader and has a deciding unit to recognize code regions in an image and to read out their code content. An at least more or less sharp image is required for such work and, particularly with a continuous code detection at an object stream, the continuous periodic moving to and fro is particularly suitable to adjust the autofocus constantly.

The method in accordance with the invention can be further developed in a similar manner and shows similar advantages in so doing. Such advantageous features are described in an exemplary, but not exclusive manner in the subordinate claims dependent on the independent claims.

Figure 2:
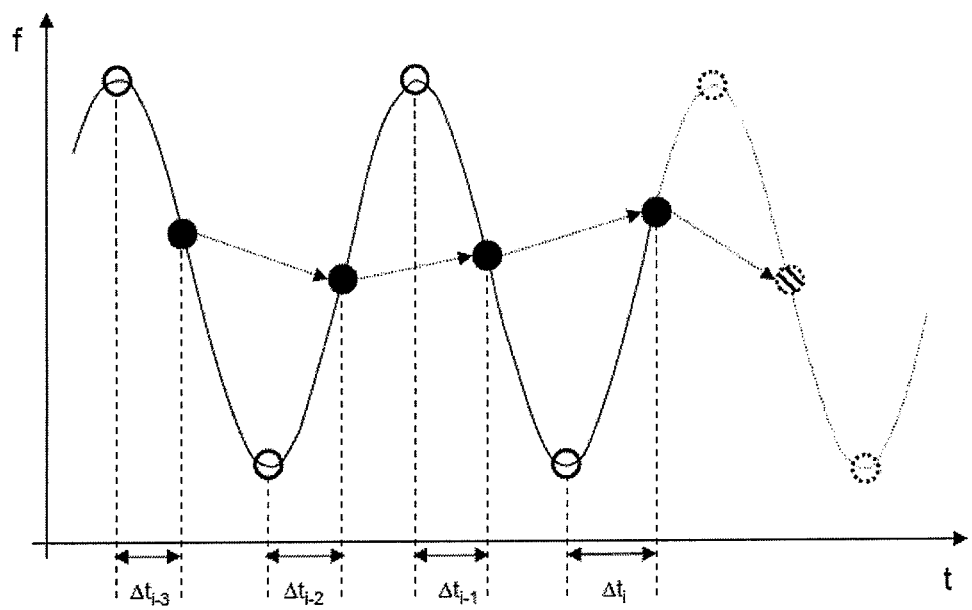
Figure 3:
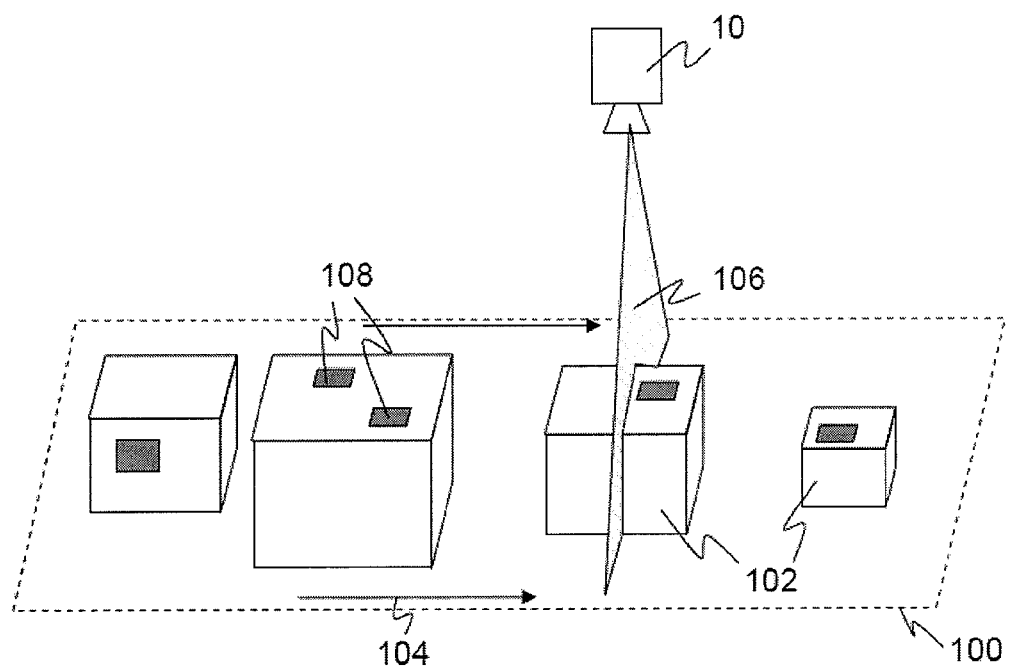

The invention will be explained in more detail in the following also with respect to further features and advantages by way of example with reference to embodiments and to the enclosed drawing. The Figures of the drawing show in:

FIG. 1 a simplified block diagram of a camera in accordance with an embodiment of the invention;

FIG. 2 an exemplary time curve of the focal position during the periodic movement for explaining the different taking times; and FIG. 3 a schematic three-dimensional view of the mounting of a camera in accordance with the invention at a conveyor belt, in particular for reading codes.

FIG. 1 shows a simplified block diagram of an embodiment of a camera 10 in accordance with the invention. The camera 10 comprises an image taking unit having an image sensor 12, an illumination 14 and a taking control 16. The image sensor 12 has a plurality of light-sensitive reception elements which can be arranged to form a line or a matrix and deliver corresponding image data resolved into pixels. Individual shots can be triggered at precisely predefinable times by the taking control 16 with the aid of a brief triggering of the illumination 14 which is in particular configured as a pulse illumination or flash illumination or with the aid of a brief opening of a shutter, not shown, of the image sensor 12.

A reception optics 18, which is shown by way of example and in simplified form as a single converging lens, is arranged upstream of the image sensor 12. Its focal position is variable with the aid of a focus adjusting unit 20 to focus the camera 10 on objects at different distances. For this purpose, different optomechanical adjustment concepts are conceivable for distances between lenses, mirrors and other optical elements of the reception optics 18, for instance motors or moving coils, but also the use of liquid lenses which influence the focal length or the back focal length of the reception optics 18 and thus the focal position.

The taking control 16 is part of a control and evaluation unit 22 which is shown as a unit in FIG. 1, but which can also be implemented on a plurality of modules. The control and evaluation unit 22 comprises three further units 24, 26, 28. A focus evaluation unit 24 receives the image data of the image sensor 12 to determine an ideal focal position in a manner still to be explained. An image processing unit 20 likewise has access to the image data of at least some shots, either through direct access to the image sensor 12 or through a connection to the focus evaluation unit 24 or access to a common memory region, not shown. The actually utilized images or images forwarded to external by the camera 10 can be treated using image processing algorithms in the image processing unit 26. Finally, a focus control unit 28 is provided which is connected to the focus adjusting unit 20 to set a desired focal position.

The focusing process or autofocus process in accordance with the invention implemented in the control and evaluation unit 22 will now be explained in more detail with reference to a time curve of the focal position shown in FIG. 2 and with reference to the triggered shots. Controlled by the focus control unit 28, the focus adjusting unit 20 periodically varies the focal position between two end abutment positions. These end abutment positions can be mechanical maximum deflections of the reception optics 18, but also parameterized end positions of a selected distance region and thus focus region. A shot is triggered at the end abutment positions, that is the reversal points of the periodic and continuous to and fro movement of the focal position, completely independently of the scenery, as shown by blank circles in FIG. 2. This shot can have a lower resolution than is aimed for in the image to be used in the final analysis in order to reduce image data and the evaluation effort.

The focus evaluation unit 24 calculates a degree of sharpness for each image taken in this way which can relate to the image as a whole, but also only to one or more regions of interest within the image. A degree of sharpness is determined, for example, via the image contract or via high-frequency portions of an image. Ultimately, a good image sharpness is shown at the transitions of directly adjacent pixels. With a sharp shot, the differences of adjacent pixels are comparatively large in regions in which the scenery has a structure, whereas these differences break down with blurred shots and are distributed over larger pixel distances.

The focus evaluation unit 24 extrapolates a focal position at which the degree of sharpness is maximized from the degrees of sharpness of the images taken at the end abutment positions. This is called extrapolation because it relates to a future focal position; it could equally be called interpolation because the focal position will usually lie within the end abutment positions.

Since the focal position varies periodically and continuously between the end abutment positions, the determined focal position of greatest image sharpness is also reached in the following half-cycle of the varying focal position. The time behavior of the varied focal position is known and predictable so that a time can be predefined with reference to the desired focal position of greatest image sharpness at which the taking control 16 triggers a shot for a further, now sharp image. These shots of sharper further images in each half-cycle are marked by solid circles in FIG. 2.

After a brief transient time, further shots can preferably be used for the extrapolation by the focus evaluation unit 4 in addition to the two shots at the end abutment position directly before a triggering of a shot in the focal position of greatest image sharpness. The available history is composed of in principle any desired number of earlier shots at the end abutment position or at earlier focal positions of greatest image sharpness.

Depending on the dynamics in the scenery, the history should be limited, for example by weightings in which older shots lose influence. Alternatively to earlier shots, only the result acquired therefrom, namely focal positions of greatest image sharpness determined for preceding half-cycles, can also be taken into account.

It is possible, but not compulsory, to trigger a sharp shot in each half-cycle. Alternatively, one or more half-cycles can elapse without such a shot. Deviations from the procedure shown in FIG. 2 are otherwise also possible. It is thus admittedly possible to trigger shots at the respective end abutment position, but other focal positions can also be used to produce images for the extrapolation. It is in particular possible to take such images at other focal positions in addition to those at the end abutment positions and thereby to increase the database for the extrapolation.

The set time to take a shot at the focal position of greatest image sharpness is preferably given relatively as the difference $\Delta t_i$ to an end abutment position. The autofocus position is thus robust with respect to fluctuations due, for instance, to temperature influences or mechanical tolerances since these effects influence in the same way the time at which end abutment positions are adopted.

Images can be further processed in a variety of ways in the image processing unit 26. In addition to correction algorithms for brightness correction, smoothing, compression and the like, images to be evaluated or to be output can be composed of a plurality of individual images. A plurality of individual images are present from the history of the earlier image shots or are produced, for example, in that not only a single shot is triggered at the focal position of greatest image sharpness, but also a plurality of shots are triggered in its surroundings. The images taken at the end abutment positions are preferably also not only used for the determination of a focal position of greatest image sharpness, but equally for such image processing procedures.

The offsetting of a plurality of individual images serves, on the one hand, to prepare total images which cover a larger region than an individual image (image stitching). In the simplest cases, image lines are arranged in rows for this purpose, but also the much more complex locating of overlap regions of single images by correlation processes and the intelligent joining together in such overlap regions with seams which are as invisible as possible is also conceivable.

Multiple shots are, however, also useful for coinciding image regions. The putting together of image regions to form objects at different distances from images which are taken at respective matching focal positions is the most illustrative. More generally, image processing procedures combine a plurality of sharp or blurred images with one another to calculate sharper images or images with higher resolution.

As a further result of the image processing, objects can be identified and object distances can be determined and output using the focal position which is required for their sharp taking. This reverses the otherwise usual autofocus process in which first the distance is determined using an additional sensor and the required focal position is determined from this.

A special kind of camera is a camera-based code reader. Here, the image processing unit 26 is additionally equipped with a decoder to identify code regions in the images and to read out their code information. A frequent use of such a camera 10 configured as a code reader is shown in FIG. 3 which shows the mounting at a conveyor belt 100 in a schematic, three-dimensional view.

Objects 102 are conveyed on the conveyor belt 100 in a direction designated by an arrow 104. The camera 10, which is here configured as a line scan camera by way of example, takes one image line in focus in its detection zone 106 in each respective half-cycle of the periodic to and fro movement of the focal position and composes the images lines to form a total image of objects 102, of codes 108 or of a desired section of the conveyor belt 100 with objects 102. The speed at which the focal position varies, and thus the duration of a half-cycle and the taking frequency, can be matched to the conveying speed and to the desired image resolution in the conveying direction.

The camera 10 preferably decodes the content of the codes 108 from the taken total images. Although FIG. 3 is, however, explained with reference to a code reader, in principle a camera 10 can also be used without the ability of decoding codes 108 to deliver a sharp image of the conveyor belt 100, of the objects 102 and of the lettering or codes possibly located thereon without any special evaluation. In order also to obtain images from other sides than above, a plurality of cameras 10 from different perspectives can also be attached.

The invention claimed is:

1. A camera (10) having an image sensor (12) for taking images, having a reception optics (18), having an adjustable focusing unit (18, 20) for setting a focal position of the reception optics (18) as well as having a control and evaluation unit (22) which is configured to continuously move the focal position of the reception optics (18) between a first focal position and a second focal position by means of the focusing unit (18, 20), meanwhile to take a respective one image at least one third focal position and one fourth focal position, wherein a focus quality of the first focal position and the second focal position is evaluated to determine a degree of sharpness of the images and to extrapolate a focal position of greatest image sharpness during continuous movement of the focal position of the reception optics,
wherein the control and evaluation unit (22) is furthermore configured to move the focal position cyclically and continuously to and fro between the first focal position and the second focal position and to take a further image when the focal position of greatest image sharpness is reached during the cyclic movement, wherein the further image is an in-focus image taken at a time extrapolated from the first focal position and the second focal position.

2. The camera (10) in accordance with claim 1,
wherein the first focal position and/or the second focal position correspond(s) to an end deflection of the focusing unit (18, 20).

3. The camera (10) in accordance with claim 1,
wherein the first focal position is the same as the third focal position and/or the second focal position is the same as the fourth focal position.

4. The camera (10) in accordance with claim 1,
wherein the control and evaluation unit (22) is configured to store at least one previously determined focal position of greatest image sharpness and to take it into account on the determination of a current focal position of greatest image sharpness.

5. The camera (10) in accordance with claim 1,
wherein the control and evaluation unit (22) is configured to take account of at least one image previously taken at a focal position of greatest image sharpness on the determination of a current focal position of greatest image sharpness.

6. The camera (10) in accordance with claim 1,
wherein the control and evaluation unit (22) is configured to join together a total image from sequentially taken images.

7. The camera (10) in accordance with claim 6, wherein the control and evaluation unit (22) is configured to join together a total image from sequentially taken image lines of objects (102) moved relative to the camera (10).

8. The camera (10) in accordance with claim 1,
wherein the control and evaluation unit (22) is configured to calculate an image having improved image sharpness from a plurality of images.

9. The camera (10) in accordance with claim 1,
wherein the control and evaluation unit (22) is configured to determine the degree of sharpness of at least one region of interest of an image and to determine the focal position of greatest image sharpness using the degree of sharpness of the region of interest.

10. The camera (10) in accordance with claim 1,
wherein the control and evaluation unit (22) is configured to calculate and to output a distance of objects (102) taken.

11. The camera (10) in accordance with claim 1,
which has a shutter or a pulse illumination device (14), and wherein the control and evaluation unit (22) is configured to fix a taking time for an image by opening the shutter or releasing an illumination pulse.

12. The camera (10) in accordance with claim 11, wherein the pulse illumination device is a flash illumination.

13. The camera (10) in accordance with claim 1,
wherein the focusing unit (18, 20) has an optomechanical adjusting unit for varying a focal length or a back focal length of the reception optics (18) or has a liquid lens.

14. The camera (10) in accordance with claim 1,
which is configured as a camera-based code reader and has a decoding unit to recognize code regions (108) in an image and to read out their code content.

15. A method for taking sharp images, wherein a focal position of a reception optics (18) is continuously moved between a first focal position and a second focal position and meanwhile a respective image is taken at least one third focal position and one fourth focal position, wherein a focus quality of the first focal position and the second focal position is evaluated to determine a degree of sharpness of the images and to extrapolate a focal position of greatest image sharpness during continuous movement of the focal position of the reception optics,
wherein the focal position is moved cyclically and continuously to and fro between the first focal position and the second focal position and a further image is taken when the focal position of greatest image sharpness is reached during the cyclic movement, wherein the further image is an in-focus image taken at a time extrapolated from the first focal position and the second focal position.

16. The method in accordance with claim 15, wherein a total image is joined together from a plurality of successively taken further images of a moved object (102) and/or an image having improved image sharpness is calculated from a plurality of images.

17. The method in accordance with claim 15, wherein code regions (108) are recognized in an image and their code contents are read out.

\* \* \* \* \*